US012301271B2

(12) United States Patent
Yuan et al.

(10) Patent No.: US 12,301,271 B2
(45) Date of Patent: May 13, 2025

(54) BEAM SWEEP ADJUSTMENT FOR A MAXIMUM PERMISSIBLE EXPOSURE CONDITION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 17/759,306

(22) PCT Filed: Feb. 20, 2020

(86) PCT No.: PCT/CN2020/075921
§ 371 (c)(1),
(2) Date: Jul. 22, 2022

(87) PCT Pub. No.: WO2021/163943
PCT Pub. Date: Aug. 26, 2021

(65) Prior Publication Data
US 2023/0058882 A1 Feb. 23, 2023

(51) Int. Cl.
*H04B 1/3827* (2015.01)
*H04W 52/34* (2009.01)

(52) U.S. Cl.
CPC ........ *H04B 1/3838* (2013.01); *H04W 52/346* (2013.01)

(58) Field of Classification Search
CPC .... H04B 7/0695; H04B 7/0617; H04B 7/088; H04B 7/0639; H04B 7/0408;
(Continued)

(56) References Cited

U.S. PATENT DOCUMENTS 11,363,663 B2   6/2022  Nagaraja et al.
11,792,701 B2 * 10/2023  Szilagyi ............ H04W 36/0083
                                                  370/331
(Continued)

FOREIGN PATENT DOCUMENTS

CN   106953667 A   7/2017
CN   109964513     7/2019
(Continued)

OTHER PUBLICATIONS

LG Electronics: "Feature Lead Summary#4 of Enhancements on Multi-beam Operations", 3GPP TSG RAN WG1 Meeting #98, R1-1909779, R1#98 FL_Summary_Multibeam(MB1) V8, 3rd Generation Partnership Project, Mobile Competence Centre, 650, Route Des Lucioles, F-06921 Sophia-Antipolis Cedex, France, vol. RAN WG1, No. Prague, CZ, Aug. 26, 2019-Aug. 30, 2019, Sep. 3, 2019, XP051766371, 38 Pages, Discussion on R1-1908192, proposal 10, p. 28, section 3.6.
(Continued)

*Primary Examiner* — Golam Sorowar
(74) *Attorney, Agent, or Firm* — Harrity & Harrity, LLP

(57) ABSTRACT

Various aspects of the present disclosure generally relate to wireless communication. In some aspects, a user equipment (UE) may determine whether an uplink communication that is scheduled to be transmitted by a plurality of physical uplink repetitions in multiple slots on a plurality of beams is subject to a maximum permissible exposure (MPE) condition. The UE may determine a transmission adjustment for the plurality of physical uplink repetitions on the plurality of beams, based at least in part on a determination that the uplink communication is subject to the MPE condition, and transmit the uplink communication based at least in part on the transmission adjustment.

30 Claims, 15 Drawing Sheets

(58) Field of Classification Search
CPC .. H04B 7/0417; H04B 7/0626; H04B 7/0404; H04B 7/0456; H04B 7/061; H04B 7/0621; H04B 7/06; H04B 7/0413; H04B 7/0619; H04B 7/0628; H04B 17/318; H04B 7/024; H04B 7/063; H04B 7/0814; H04B 7/0632; H04W 16/28; H04W 72/046; H04W 52/146; H04W 74/0833; H04W 72/23; H04W 52/42; H04W 24/10; H04W 72/21; H04W 52/242; H04W 52/325; H04W 52/367; H04W 72/0446; H04W 52/50; H04W 72/20; H04W 72/542; H04W 76/27; H04W 88/08; H04W 52/362; H04L 5/0048; H04L 5/0023; H04L 5/0053; H04L 5/0051; H04L 5/005; H04L 5/0055; H04L 5/0091; H04L 25/0204; H04L 5/0007; H04L 5/001; H04L 5/00; H04L 5/0094; H04L 5/0098; H04L 27/0008; H04L 27/26025; H04L 5/0082; H04L 1/189; H04L 25/0224; H04L 25/0226

See application file for complete search history.

(56) References Cited

U.S. PATENT DOCUMENTS

| | | |
|---|---|---|
| 2018/0167897 A1 | 6/2018 | Sampath et al. |
| 2018/0278318 A1* | 9/2018 | Chakraborty ....... H04W 52/367 |
| 2018/0368081 A1* | 12/2018 | Akkarakaran ........ H04W 52/42 |
| 2019/0313389 A1 | 10/2019 | John Wilson et al. |
| 2020/0028652 A1* | 1/2020 | Bai ..................... H04B 7/0695 |
| 2020/0053712 A1* | 2/2020 | Josan .................. H04B 7/0617 |
| 2020/0145079 A1* | 5/2020 | Marinier ............... H04W 72/23 |

FOREIGN PATENT DOCUMENTS

| | | |
|---|---|---|
| CN | 110431755 | 11/2019 |
| WO | WO-2017196612 A1 | 11/2017 |
| WO | WO-2018111844 A1 | 6/2018 |
| WO | 2018156435 A1 | 8/2018 |
| WO | WO-2018175002 A1 | 9/2018 |

OTHER PUBLICATIONS

Supplementary European Search Report—EP20919640—Search Authority—The Hague—Oct. 16, 2023.

International Search Report and Written Opinion—PCT/CN2020/075921—ISAEPO—Nov. 9, 2020.

Prague, Czech Republic, "Power Ramping and Power control for RACH Procedure", 3GPP TSG-RAN WG1 Meeting #90, Aug. 12, 2017, section 2 of the text.

* cited by examiner

BEAM SWEEP ADJUSTMENT FOR A MAXIMUM PERMISSIBLE EXPOSURE CONDITION

CROSS-REFERENCE TO RELATED APPLICATION

This Patent Application is a 371 national stage of PCT Application No. PCT/CN2020/075921 filed on Feb. 20, 2020, entitled "BEAM SWEEP ADJUSTMENT FOR A MAXIMUM PERMISSIBLE EXPOSURE CONDITION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam sweep adjustment for a maximum permissible exposure condition.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining whether an uplink communication that is scheduled to be transmitted by a plurality of physical uplink repetitions in multiple slots on a plurality of beams is subject to a maximum permissible exposure (MPE) condition. The method may include determining a transmission adjustment for the plurality of physical uplink repetitions on the plurality of beams, based at least in part on a determination that the uplink communication is subject to the MPE condition, and transmitting the uplink communication based at least in part on the transmission adjustment.

In some aspects, a method of wireless communication, performed by a base station, may include receiving an indication of a transmission adjustment by a UE for an uplink communication that is scheduled to be transmitted by a plurality of physical uplink repetitions in multiple slots on a plurality of beams and that is subject to an MPE condition, and preparing for reception of the uplink communication based at least in part on the indication of the transmission adjustment.

In some aspects, a UE for wireless communication may include a memory and one or more processors operatively coupled to the memory. The memory and the one or more processors may be configured to determine whether an uplink communication that is scheduled to be transmitted by a plurality of physical uplink repetitions in multiple slots on a plurality of beams is subject to an MPE condition, determine a transmission adjustment for the plurality of physical uplink repetitions on the plurality of beams, based at least in part on a determination that the uplink communication is subject to the MPE condition, and transmit the uplink communication based at least in part on the transmission adjustment.

In some aspects, a base station for wireless communication may include a memory and one or more processors operatively coupled to the memory. The memory and the one or more processors may be configured to receive an indication of a transmission adjustment by a UE for an uplink communication that is scheduled to be transmitted by a plurality of physical uplink repetitions in multiple slots on a plurality of beams and that is subject to an MPE condition, and prepare for reception of the uplink communication based at least in part on the indication of the transmission adjustment.

In some aspects, a non-transitory computer-readable medium may store one or more instructions for wireless communication. The one or more instructions, when executed by one or more processors of a UE, may cause the one or more processors to determine whether an uplink communication that is scheduled to be transmitted by a plurality of physical uplink repetitions in multiple slots on a plurality of beams is subject to an MPE condition, determine a transmission adjustment for the plurality of physical uplink repetitions on the plurality of beams, based at least in part on a determination that the uplink communication is subject to the MPE condition, and transmit the uplink communication based at least in part on the transmission adjustment.

In some aspects, a non-transitory computer-readable medium may store one or more instructions for wireless communication. The one or more instructions, when executed by one or more processors of a base station, may cause the one or more processors to receive an indication of a transmission adjustment by a UE for an uplink communication that is scheduled to be transmitted by a plurality of physical uplink repetitions in multiple slots on a plurality of beams and that is subject to an MPE condition, and prepare for reception of the uplink communication based at least in part on the indication of the transmission adjustment.

In some aspects, an apparatus for wireless communication may include means for determining whether an uplink communication that is scheduled to be transmitted by a plurality of physical uplink repetitions in multiple slots on a plurality of beams is subject to an MPE condition, means for determining a transmission adjustment for the plurality of physical uplink repetitions on the plurality of beams, based at least in part on a determination that the uplink communication is subject to the MPE condition, and means for transmitting the uplink communication based at least in part on the transmission adjustment.

In some aspects, an apparatus for wireless communication may include means for receiving an indication of a transmission adjustment by a UE for an uplink communication that is scheduled to be transmitted by a plurality of physical uplink repetitions in multiple slots on a plurality of beams and that is subject to an MPE condition, and means for preparing for reception of the uplink communication based at least in part on the indication of the transmission adjustment.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
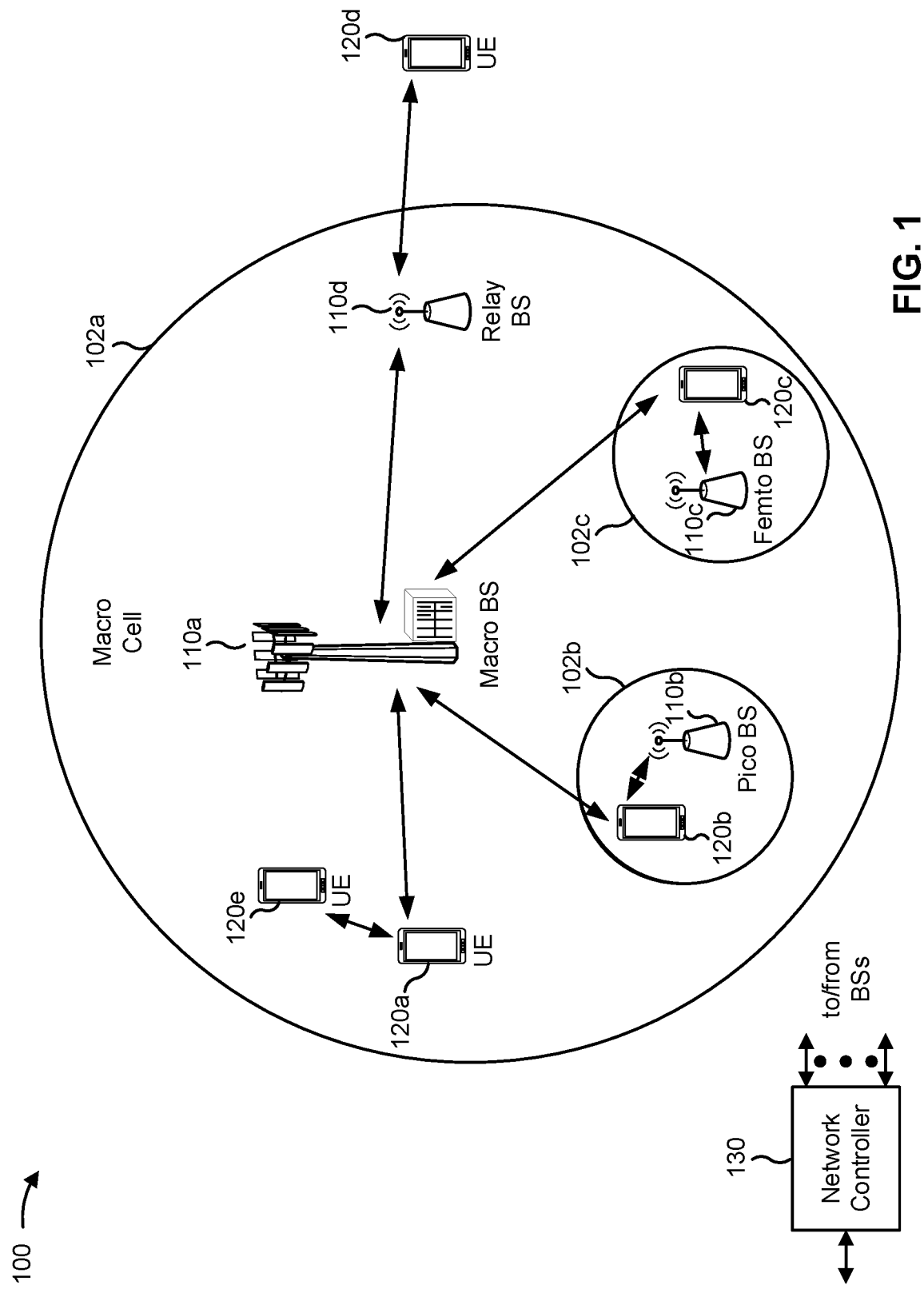
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
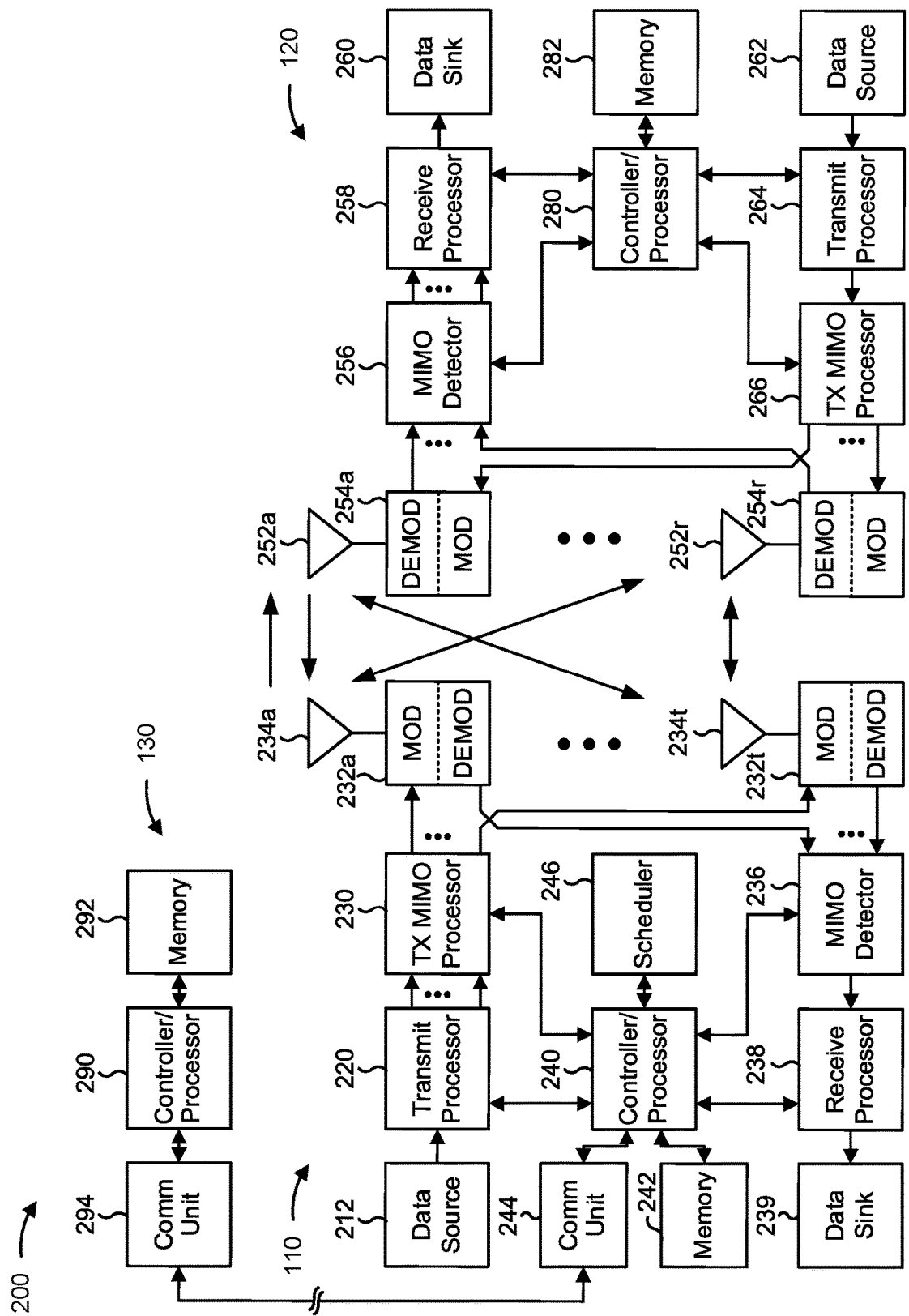
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with beam sweep adjustment for a maximum permissible exposure condition, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 1400 of FIG. 14, process 1500 of FIG. 15, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for determining whether an uplink communication that is scheduled to be transmitted by a plurality of physical uplink repetitions in multiple slots on a plurality of beams is subject to a maximum permissible exposure (MPE) condition, means for determining a transmission adjustment for the plurality of physical uplink repetitions on the plurality of beams, based at least in part on a determination that the uplink communication is subject to the MPE condition, means for transmitting the uplink communication based at least in part on the transmission adjustment, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving an indication of a transmission adjustment by a UE for an uplink communication that is scheduled to be transmitted by a plurality of physical uplink repetitions in multiple slots on a plurality of beams and that is subject to an MPE condition, means for preparing for reception of the uplink communication based at least in part on the indication of the transmission adjustment, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
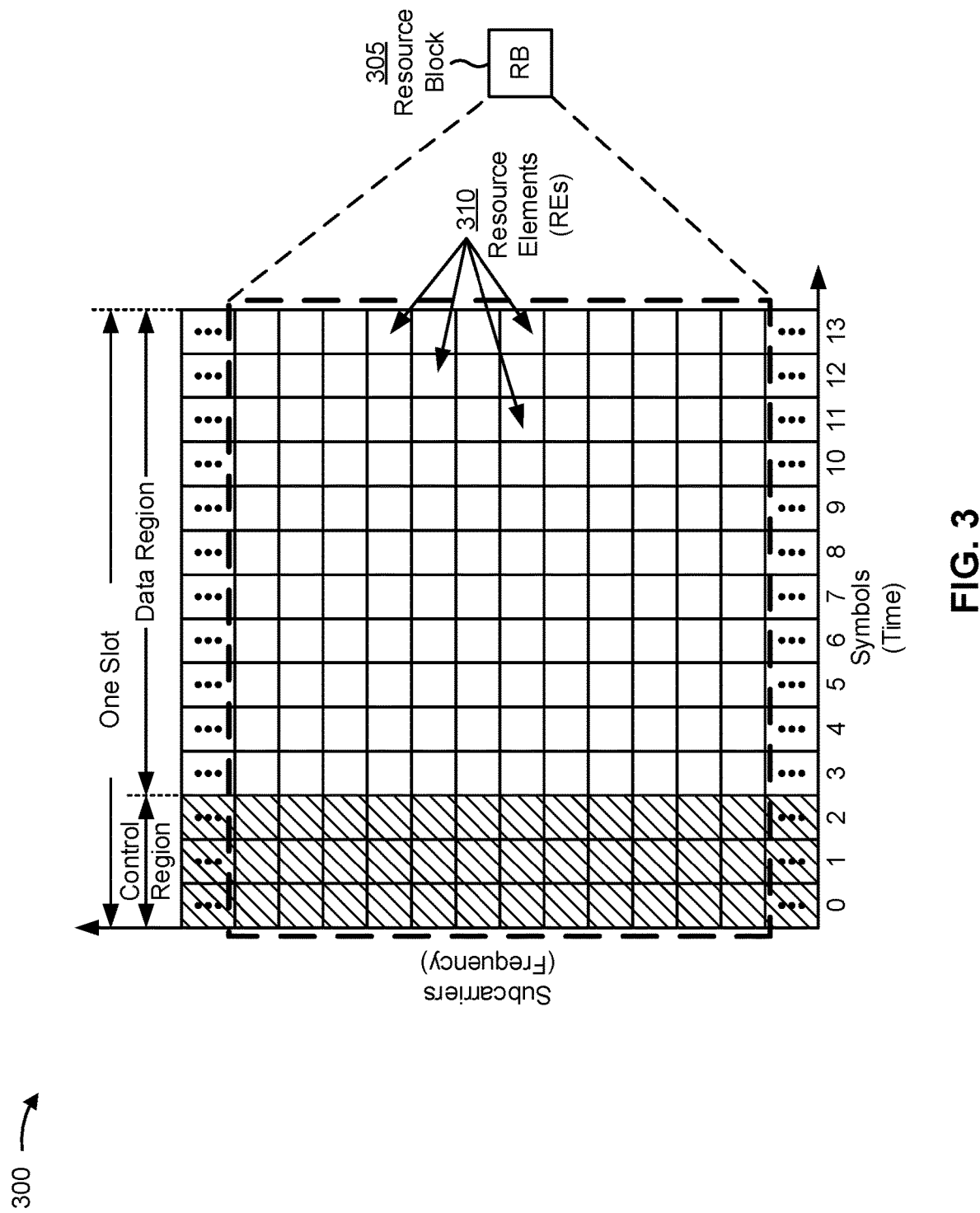
FIG. 3 is a diagram illustrating an example of a slot format, in accordance with various aspects of the present disclosure.

FIG. 3 is a diagram illustrating an example 300 of a slot format, in accordance with various aspects of the present disclosure. As shown in FIG. 3, time-frequency resources in a radio access network may be partitioned into resource blocks, shown by a single resource block (RB) 305. An RB 305 is sometimes referred to as a physical resource block (PRB). An RB 305 includes a set of subcarriers (e.g., 12 subcarriers) and a set of symbols (e.g., 14 symbols) that are schedulable by a base station 110 as a unit. In some aspects, an RB 305 may include a set of subcarriers in a single slot. As shown, a single time-frequency resource included in an RB 305 may be referred to as a resource element (RE) 310. An RE 310 may include a single subcarrier (e.g., in frequency) and a single symbol (e.g., in time). A symbol may be referred to as an orthogonal frequency division multiplexing (OFDM) symbol. An RE 310 may be used to transmit one modulated symbol, which may be a real value or a complex value.

In some telecommunication systems (e.g., NR), RBs 305 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing, a cyclic prefix format, and/or the like). A slot may be configured with a link direction (e.g., downlink or uplink) for transmission. In some aspects, the link direction for a slot may be dynamically configured. In some communications systems, such as 5G or NR, a UE may transmit a communication to a base station on a physical uplink channel (e. g., a physical uplink control channel (PUCCH), a physical uplink shared channel (PUSCH), and/or the like) in one or more slots.

As indicated above, FIG. 3 is provided as an example. Other examples may differ from what is described with respect to FIG. 3.

Figure 4:
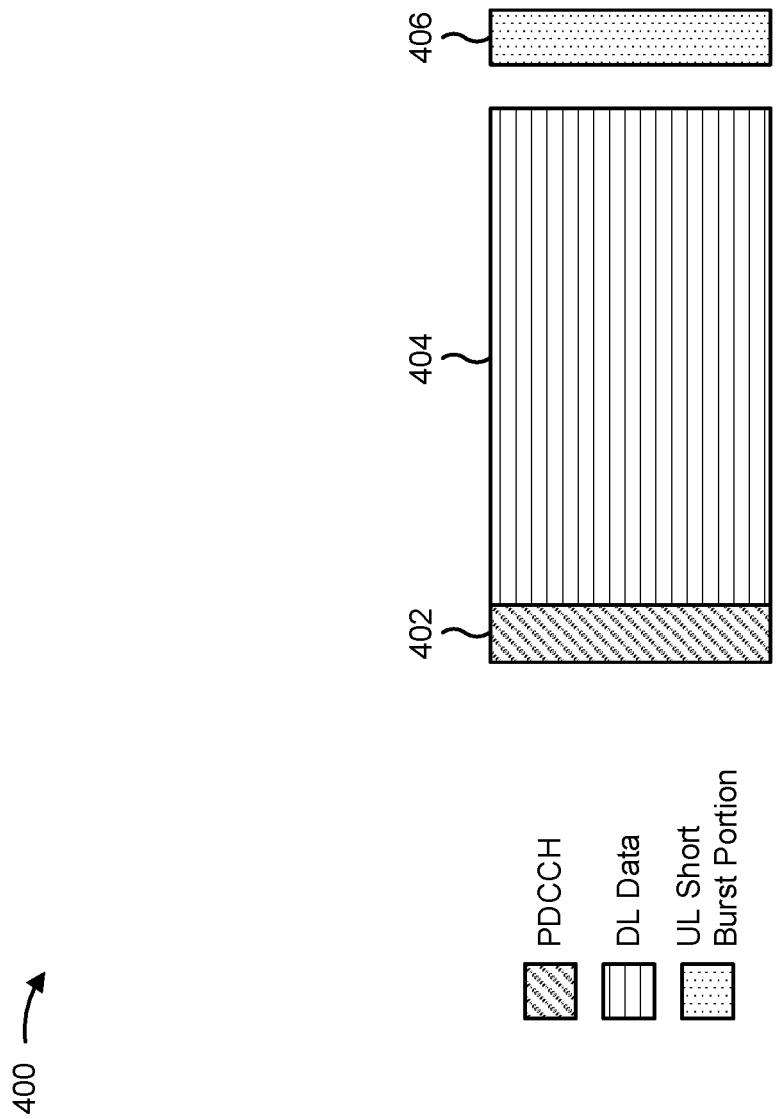
FIG. 4 is a diagram showing an example of a downlink-centric slot or wireless communication structure, in accordance with various aspects of the present disclosure.

FIG. 4 is a diagram 400 showing an example of a downlink (DL)-centric slot or wireless communication structure, in accordance with various aspects of the present disclosure. The DL-centric slot may include a control portion 402. The control portion 402 may exist in the initial or beginning portion of the DL-centric slot. The control portion 402 may include various scheduling information and/or control information corresponding to various portions of the DL-centric slot. In some configurations, the control portion 402 may be a physical downlink control channel (PDCCH), as indicated in FIG. 4. In some aspects, the control portion 402 may include legacy PDCCH information, shortened PDCCH (sPDCCH) information, a control format indicator (CFI) value (e.g., carried on a physical control format indicator channel (PCFICH)), one or more grants (e.g., downlink grants, uplink grants, and/or the like), and/or the like.

The DL-centric slot may also include a DL data portion 404. The DL data portion 404 may sometimes be referred to as the payload of the DL-centric slot. The DL data portion 404 may include the communication resources utilized to communicate DL data from the scheduling entity (e.g., UE or BS) to the subordinate entity (e.g., UE). In some configurations, the DL data portion 404 may be a physical DL shared channel (PDSCH).

The DL-centric slot may also include an uplink (UL) short burst portion 406. The UL short burst portion 406 may sometimes be referred to as an UL burst, an UL burst portion, a common UL burst, a short burst, an UL short burst, a common UL short burst, a common UL short burst portion, and/or various other suitable terms. In some aspects, the UL short burst portion 406 may include one or more reference signals. Additionally, or alternatively, the UL short burst portion 406 may include feedback information corresponding to various other portions of the DL-centric slot. For example, the UL short burst portion 406 may include feedback information corresponding to the control portion 402 and/or the data portion 404. Non-limiting examples of information that may be included in the UL short burst portion 406 include an acknowledgement (ACK) signal (e.g., a PUCCH ACK, a PUSCH ACK, an immediate ACK), a negative acknowledgement (NACK) signal (e.g., a PUCCH NACK, a PUSCH NACK, an immediate NACK), a scheduling request (SR), a buffer status report (BSR), a hybrid automatic repeat request (HARD) indicator, a channel state indication (CSI), a channel quality indicator (CQI), a sounding reference signal (SRS), a demodulation reference signal (DMRS), PUSCH data, and/or various other suitable types of information. The UL short burst portion 406 may include additional or alternative information, such as information pertaining to random access channel (RACH) procedures, scheduling requests, and various other suitable types of information.

As illustrated in FIG. 4, the end of the DL data portion 404 may be separated in time from the beginning of the UL short burst portion 406. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is one example of a DL-centric wireless communication structure, and alternative structures having similar features may exist without necessarily deviating from the aspects described herein.

As indicated above, FIG. 4 is provided as an example. Other examples may differ from what is described with regard to FIG. 4.

Figure 5:
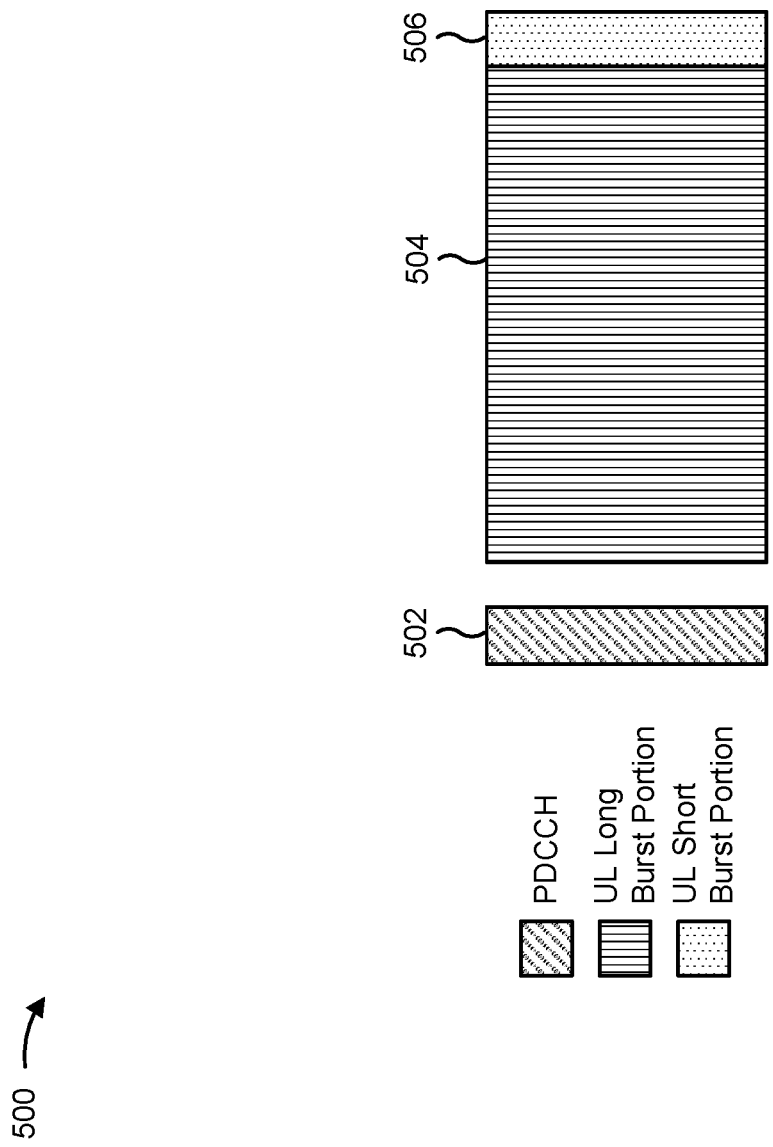
FIG. 5 is a diagram showing an example of an uplink-centric slot or wireless communication structure, in accordance with various aspects of the present disclosure.

FIG. 5 is a diagram 500 showing an example of an UL-centric slot or wireless communication structure, in accordance with various aspects of the present disclosure. The UL-centric slot may include a control portion 502. The control portion 502 may exist in the initial or beginning portion of the UL-centric slot. The control portion 502 in FIG. 5 may be similar to the control portion 502 described above with reference to FIG. 5. The UL-centric slot may also include an UL long burst portion 504. The UL long burst portion 504 may sometimes be referred to as the payload of the UL-centric slot. The UL portion may refer to the communication resources utilized to communicate UL data from the subordinate entity (e.g., UE) to the scheduling entity (e.g., UE or BS). In some configurations, the control portion 502 may be a PDCCH.

As illustrated in FIG. 5, the end of the control portion 502 may be separated in time from the beginning of the UL long burst portion 504. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric slot may also include an UL short burst portion 506. The UL short burst portion 506 in FIG. 5 may be similar to the UL short burst portion 406 described above with reference to FIG. 4, and may include any of the information described above in connection with FIG. 4. The foregoing is one example of an UL-centric wireless communication structure, and alternative structures having similar features may exist without necessarily deviating from the aspects described herein.

As indicated above, FIG. 5 is provided as an example. Other examples may differ from what is described with regard to FIG. 5.

Figure 6:
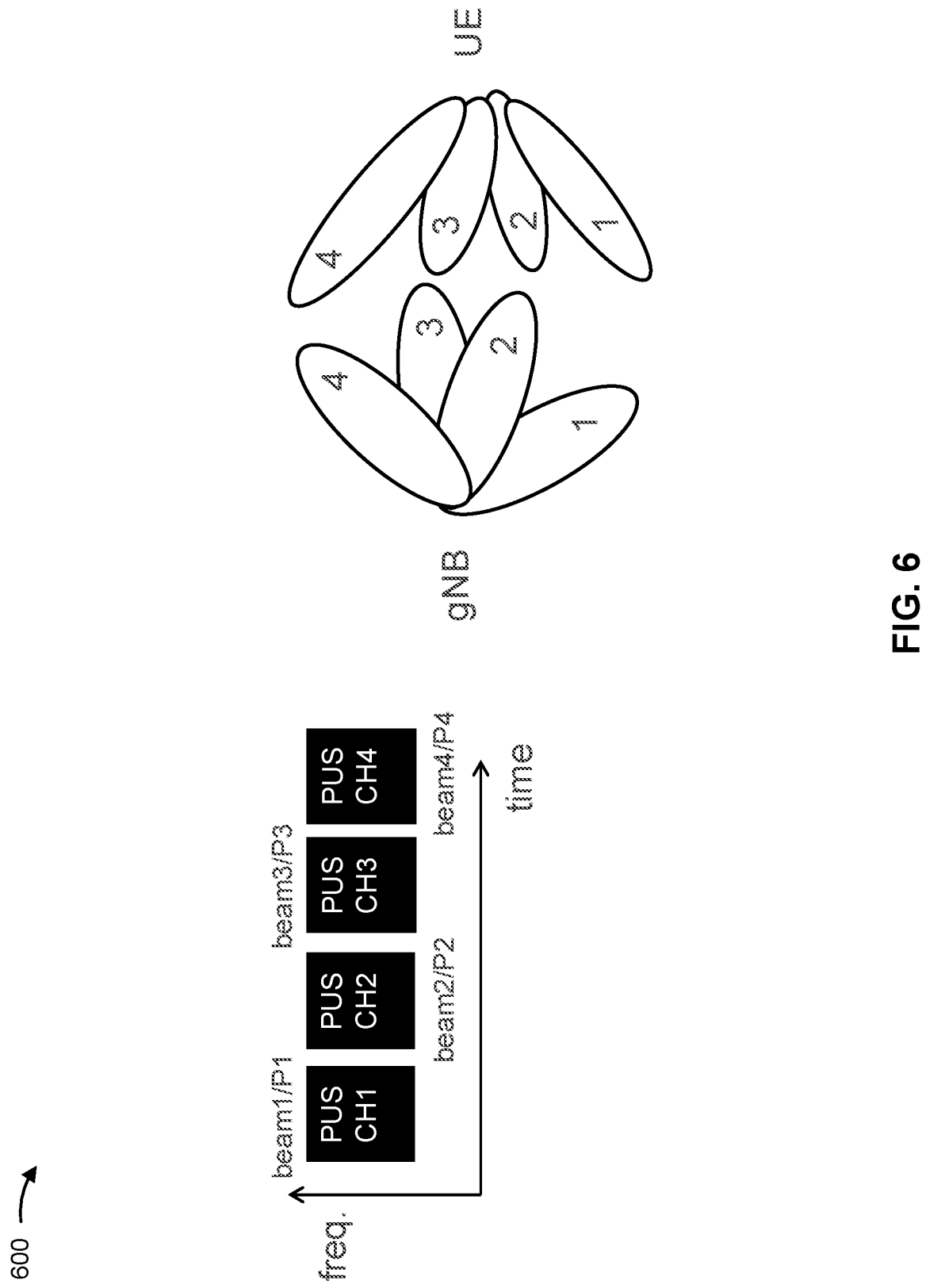
FIG. 6 illustrates an example of an uplink transmission on a physical uplink shared channel with beam sweeping, in accordance with various aspects of the present disclosure.

FIG. 6 illustrates an example 600 of an uplink transmission on a PUSCH with beam sweeping, in accordance with various aspects of the present disclosure.

Uplink repetition involves repeating the same information in one or more slots. Uplink repetition may be used to improve coverage without increasing overhead, such as for ultra reliable low latency communications, enhanced mobile broadband communications, or massive machines type communications. Uplink repetition may be used for PUSCH repetitions, PUCCH repetitions, or SRS repetitions. FIG. 6 shows PUSCH repetitions in multiple slots, where each repetition is on a different beam (e.g., Beam1, Beam2, Beam3, Beam4) with possibly a different transmit power. As shown in FIG. 6, an uplink transmission may have the same data repeated, for example, 4 times in 4 slots. The uplink transmission may have more than 4 PUSCH repetitions.

In NR, a base station (e.g., gNB) may transmit signals in different directions using transmitting beams, and receive signals from different directions using receiving beams. A beam may be specified by a beam configuration. For a downlink communication, the beam configuration may be one or more transmission control indication (TCI) states. A TCI state may specify one or more antenna ports and/or a direction for an active beam for transmitting the downlink communication towards a UE. There may be one or more TCI states for each bandwidth part of one or more component carriers that the base station uses for transmission. In some aspects, a TCI may identify a reference signal, such as a channel state information reference signal (CSI-RS), a synchronization signal block (SSB), a sounding reference signal (SRS), and/or the like, which is associated with a beam or a reception spatial filter providing spatial relation information or quasi-co-location (QCL) information. In some aspects, a TCI may identify a reference signal set, such as a CSI-RS resource set, an SRS resource set, and/or the like.

A UE may also transmit signals in different directions using transmitting beams, and receive signals from different directions using receiving beams. The UE may also identify the transmitting beam of the BS. Sometimes, the UE may perform a beam sweep to identify the transmitting beam of the BS. A UE may perform the beam sweep by transmitting beams in all predefined directions in a burst in a regular interval. The UE may then perform one or more measurements on one or more samples of beams to identify a beam to use. A beam configuration for uplink communications may be referred to as an uplink spatial filter. The UE may use an RS, such as an SRS, to identify characteristics of communications in order to improve a transmission beam or receiving beam setting of the UE.

An uplink beam and a downlink beam may form a reciprocal beam pair, where the uplink beam is used for transmission at the UE and reception at the base station, and the downlink beam is used for transmission at the base station and reception at the UE. In a reciprocal beam pair, the uplink beam and the downlink beam may be in the same direction or path (e.g., with energy radiating in a particular direction or path more than other directions or paths), but communications on the uplink beam may propagate in the opposite direction as communications on the downlink beam. FIG. 6 shows 4 beam pairs. Further, electrical characteristics of an antenna used to transmit and receive communications via a reciprocal beam pair may be the same, such as gain, radiation pattern, impedance, bandwidth, resonant frequency, polarization, and/or the like, regardless of whether the antenna is transmitting or receiving, due to the reciprocity theorem of electromagnetics.

As indicated above, FIG. 6 is provided as an example. Other examples may differ from what is described with regard to FIG. 6.

Figure 7:
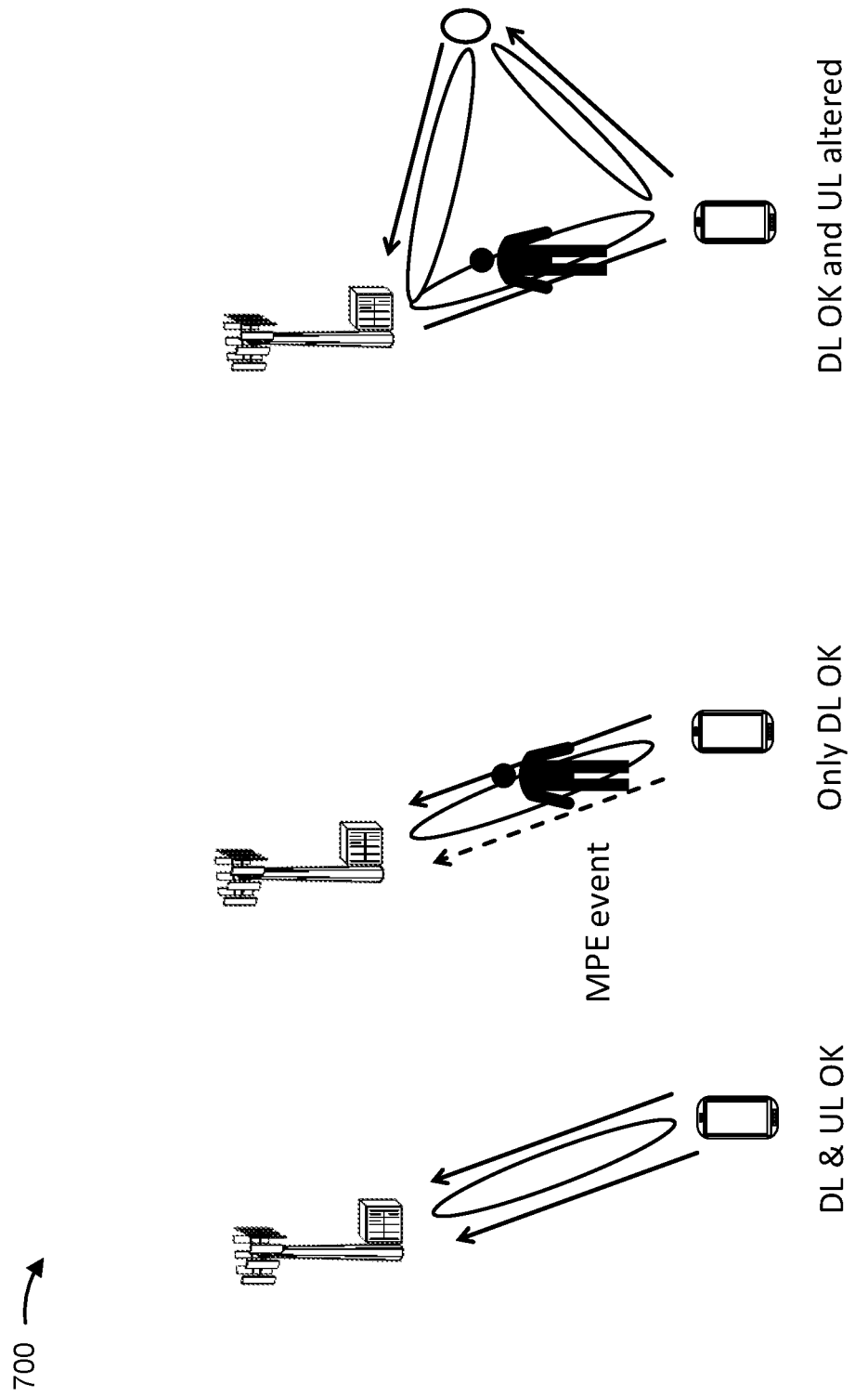
FIG. 7 is a diagram illustrating an example of a maximum permissible exposure (MPE) condition.

FIG. 7 is a diagram illustrating an example 700 of an MPE condition. FIG. 7 shows a UE and a base station that may communicate with each other.

As shown in FIG. 7, the UE and the base station may be capable of communicating via one or more beams, and a communication via a beam may take multiple different paths (cluster of paths) to reach a receiver. In some cases, a beam may be a millimeter wave (mmWave) beam that carries a communication in the mmWave frequency band. When transmitting in the mmWave frequency band, a transmitter may use a higher antenna gain as compared to transmitting in the sub-6 gigahertz (GHz) frequency band. As a result, the effective isotropic radiated power (EIRP), which represents the radiated power in a particular direction (e.g., the direction of the beam), may be higher for mmWave communications as compared to sub-6 GHz communications. Some governing bodies have placed restrictions on the peak EIRP that can be directed toward the human body. These restrictions are sometimes referred to as MPE limitations, MPE constraints, and/or the like.

An MPE condition or event may be due to a hand blocking scenario, where a hand of a user of the UE blocks or obstructs communications to and/or from an antenna subarray of the UE, or is otherwise positioned near the antenna subarray. Additionally, or alternatively, the MPE condition may be due to the position of another body part of the user, such as the user's face, head, ear, leg, and/or the like. As shown in FIG. 7, when the UE is subject to an MPE condition, a downlink beam may be suitable for use by the UE to communicate with the base station, but an uplink beam may not be permitted for use due to the MPE condition.

As indicated above, when the UE is subject to an MPE condition, a downlink beam of a reciprocal beam pair may be suitable for use by the UE to receive communications from the base station, and may have better beam conditions (e.g., a stronger beam) as compared to other downlink beams, but an uplink beam of the reciprocal beam pair may not be permitted for transmission of communications by the UE due to the MPE condition. For example, the downlink beam may not be subject to an MPE constraint because an EIRP level of a transmission by the base station may subside by the time the transmission reaches the UE and/or the user's hand or other body part. However, the uplink beam may be subject to an MPE constraint because an EIRP level of a transmission by the UE may exceed a permitted EIRP level due to the close proximity of the UE and the user's hand or other body part.

In such a case, it may be beneficial for the UE and/or the base station to use a first beam for uplink communications and a second beam for downlink communications, where the first beam (e.g., a UE uplink beam or a BS uplink beam) does not form a reciprocal beam pair with the second beam (e.g., a UE downlink beam or a BS downlink beam). In some aspects, the UE may select non-reciprocal UE beams to communicate with the base station even if the base station is using reciprocal BS beams to communicate with the UE. For example, the UE uplink beam may be included in another cluster. By choosing distinct UE uplink and UE downlink beams, the UE may improve performance while satisfying an MPE constraint.

The UE may determine, for a candidate UE uplink beam, a maximum transmit power due to an MPE constraint (e.g., an MPE limitation, an MPE restriction, and/or the like). As used herein, the maximum transmit power due to the MPE constraint may be referred to as an MPE-constrained maximum transmit power. In some aspects, the MPE-constrained maximum transmit power for a candidate UE uplink beam may vary over time due to, for example, movement of the UE, rotation of the UE, and/or the like. Thus, the UE may determine the MPE-constrained maximum transmit power for a candidate UE uplink beam at a specific time, for a specific time period, and/or the like.

In some aspects, the UE may determine the MPE-constrained maximum transmit power for a candidate UE uplink beam based at least in part on an EIRP value for the candidate UE uplink beam, a maximum or peak EIRP value stored by the UE (e.g., as dictated by a governing body, as specified in a wireless communication standard, as configured for the UE, and/or the like), a determination of whether the candidate UE uplink beam is directed toward a body (e.g., a human body), and/or the like. For example, if the candidate UE uplink beam is not directed toward a body, then the UE may set the MPE-constrained maximum transmit power to a maximum transmit power value for the UE, which may be stored by the UE, may be determined based at least in part on a class of the UE, may be specified by a wireless communication standard, and/or the like. However, if the candidate UE uplink beam is directed toward a body, then the UE may set the MPE-constrained maximum transmit power based at least in part on a determined EIRP value for the candidate UE uplink beam and/or a maximum permitted EIRP value.

As indicated above, FIG. 7 is provided as an example. Other examples are possible and may differ from what was described in connection with FIG. 7.

Uplink repetition, beam sweeping, and MPE conditions have been separately explained above. In some cases of beam swept uplink repetition, there may be an MPE condition. If the MPE condition causes the uplink transmission to fail, resources will be wasted and latency will increase.

Some aspects described herein provide techniques and apparatuses for beam sweep adjustment for an MPE condition on a multi-slot physical uplink channel. A UE may determine whether an uplink communication, that is scheduled to be transmitted by physical uplink repetitions in multiple slots on multiple beams, is subject to an MPE condition. The UE may determine a transmission adjustment for the physical uplink repetitions on the beams based at least in part on a determination that the uplink communication is subject to the MPE condition. The UE may transmit the uplink communication based at least in part on the transmission adjustment. The physical uplink repetitions may be PUSCH repetitions, PUCCH repetitions, or SRS repetitions. In some aspects, the UE may provide an indication of the transmission adjustment to the base station.

In some aspects, the transmission adjustment may include dropping physical uplink repetitions for one or more of the beams based at least in part on a determination that the beams are subject to the MPE condition. As a result, the UE may transmit the uplink communication while satisfying an MPE constraint that is due to the MPE condition. The UE and the base station may avoid wasting resources or increasing latency for the uplink communication.

Figure 8:
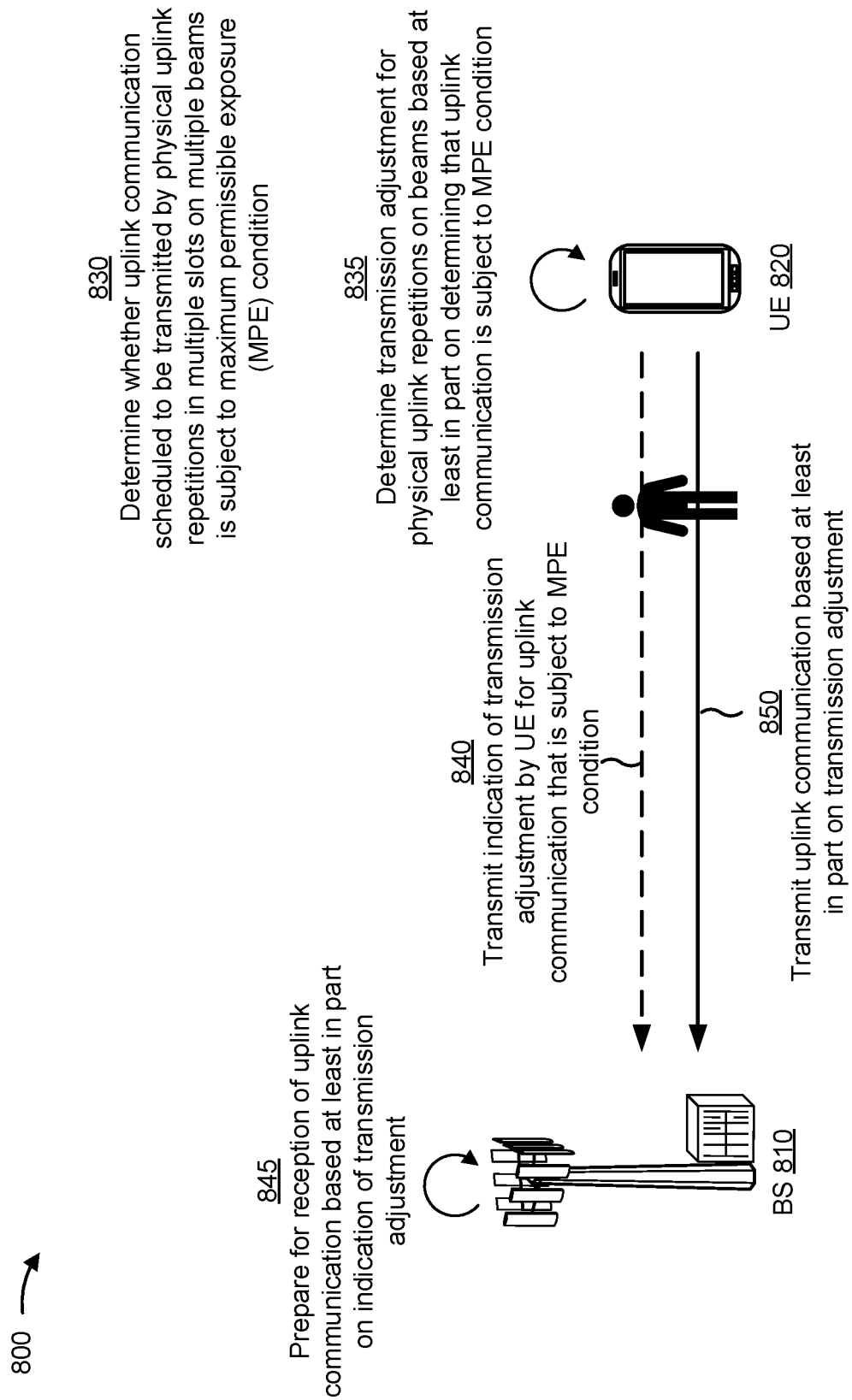
FIG. 8 illustrates an example of beam sweep adjustment for an MPE condition, in accordance with various aspects of the present disclosure.

FIG. 8 illustrates an example 800 of beam sweep adjustment for an MPE condition, in accordance with various aspects of the present disclosure. FIG. 8 shows a base station (BS) 810 (e.g., BS 110 depicted in FIGS. 1 and 2) and a UE 820 (e.g., UE 120 depicted in FIGS. 1 and 2) that may communicate with one another. UE 820 may be configured for multi-panel uplink transmission with physical uplink repetitions in multiple slots with beam sweeping, where each repetition may be in a different beam or have a different transmit power.

As shown by reference number 830, UE 820 may determine whether an uplink communication, scheduled to be transmitted by physical uplink repetitions in multiple slots on multiple beams, is subject to an MPE condition. UE 820 may use one or more sensors (e.g., ultrasonic proximity sensor, thermal proximity sensor, diode sensor, and/or the like) to determine that a human or a body part of a human is nearby and/or may be in a beam path between UE 820 and BS 810. UE 820 may compare detection information and a proximity threshold to determine whether there is an MPE condition. UE 820 may also make an MPE condition determination based at least in part on a frequency range, a spatial filter configuration, a power density, a transmit power, a length of the uplink communication, and/or the like for the uplink communication.

As shown by reference number 835, UE 820 may determine a transmission adjustment for the physical uplink repetitions on the beams based at least in part on determining that the uplink communication is subject to the MPE condition. In some aspects, the transmission adjustment may include dropping or reducing a transmit power for physical uplink repetitions in one or more beams. In some aspects, transmit power may be rebalanced among physical uplink repetitions in remaining beams. For example, UE 820 may increase a transmit power of remaining beams due to dropping beams subject to an MPE condition. UE 820 may increase a transmit power evenly across the remaining beams, or proportionally according to a ratio of a transmit power for each remaining beam and a total transmit power of the remaining beams.

As shown by reference number 840, UE 820 may transmit an indication of the transmission adjustment to BS 810. The indication may indicate dropped beams, a power value for remaining beams, and/or the like. As shown by reference number 845, BS 810 may prepare for reception of the uplink communication based at least in part on the indication of the transmission adjustment. For example, if BS 810 receives an indication that beams 2 and 3 are dropped, BS 810 may deactivate use of beams 2 and 3 for receiving the uplink communication. BS 810 may also prepare for repetition drops by reconfiguring related signaling and time resources.

As shown by reference number 850, UE 820 may transmit the uplink communication based at least in part on the transmission adjustment. UE 820 may transmit the uplink communication below an MPE constraint for the uplink communication. As a result, the uplink communication may be successful, which causes BS 810 and UE 820 to save processing and signaling resources.

As indicated above, FIG. 8 is provided as an example. Other examples are possible and may differ from what was described in connection with FIG. 8.

Figure 9:
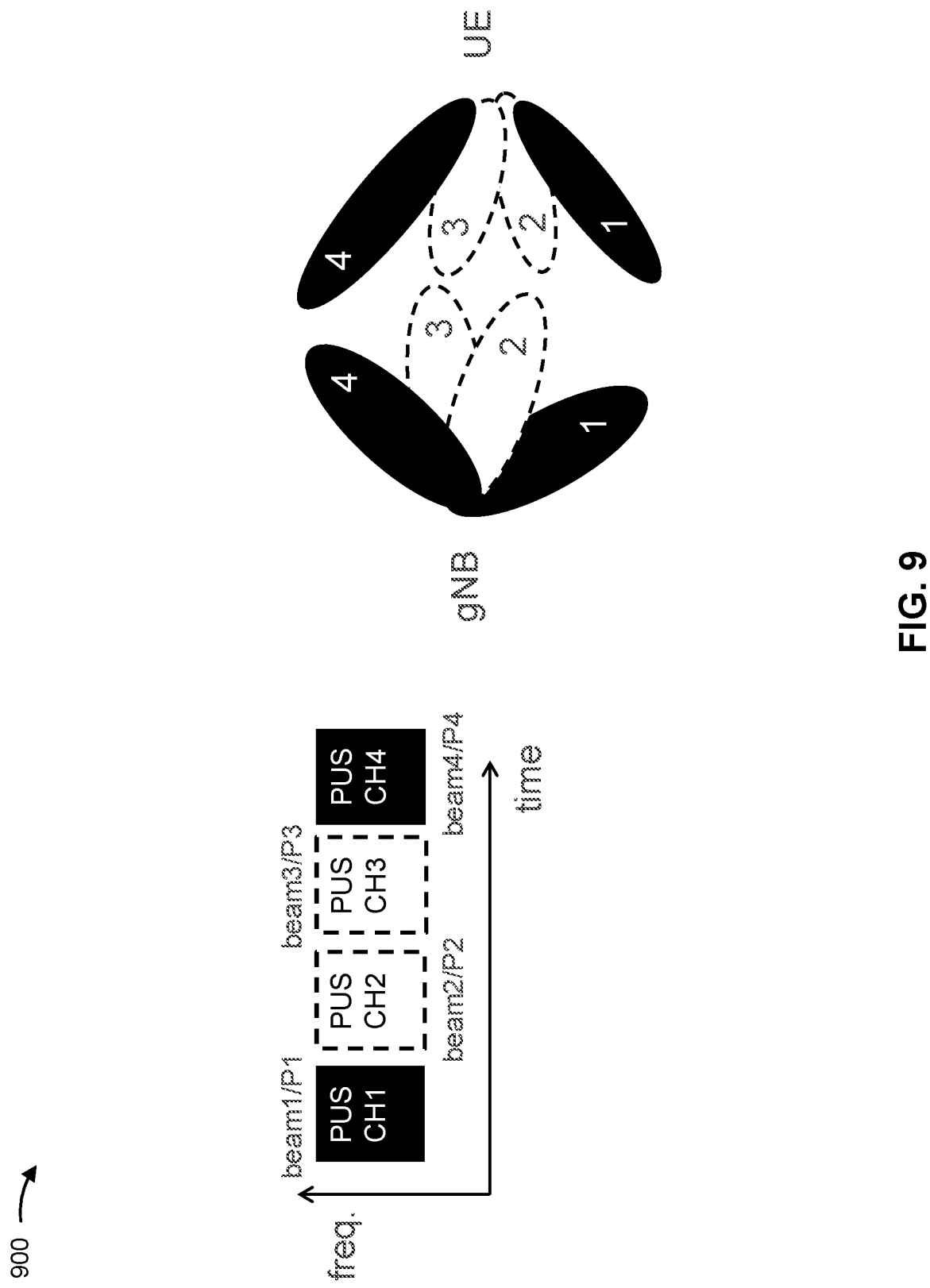
FIG. 9 illustrates an example of beam sweep adjustment for an MPE condition, in accordance with various aspects of the present disclosure.

FIG. 9 illustrates an example 900 of beam sweep adjustment for an MPE condition, in accordance with various aspects of the present disclosure. As shown in FIG. 9, a UE (e.g., UE 120, UE 820 depicted in FIG. 8) and a base station (e.g., a gNB, BS 110, BS 810 depicted in FIG. 8) may communicate with each other. The UE may be configured for multi-panel uplink transmission with physical uplink repetitions in one or more slots with beam sweeping, where each repetition may be in a different beam (shown as beam1, beam2, beam3, and beam4) and/or have a different transmit power (P1, P2, P3, P4).

In this example, the UE may determine that an uplink communication, that is scheduled to be transmitted by physical uplink repetitions (e.g., PUSCH repetitions) in multiple slots on multiple beams, is subject to an MPE condition. The UE may determine a transmission adjustment for the physical uplink repetitions on the beams based at least in part on a determination that the uplink communication is subject to the MPE condition.

As shown in FIG. 9, the transmission adjustment may include transmitting some of the physical uplink repetitions and dropping some of the physical uplink repetitions. For example, the first and fourth physical uplink repetitions (dark boxes) for the uplink communication on beams 1 and 4 are transmitted, whereas the second and third physical uplink repetitions (light boxes) for the uplink communication on beams 2 and 3 are dropped. As a result, a power duty-cycle of the physical uplink repetitions is reduced because a total transmit power for the repetitions is less than before any repetitions were dropped and transmit power was rebalanced. The reduced power duty cycle may satisfy an MPE constraint.

As indicated above, FIG. 9 is provided as an example. Other examples may differ from what is described with regard to FIG. 9.

Figure 10:
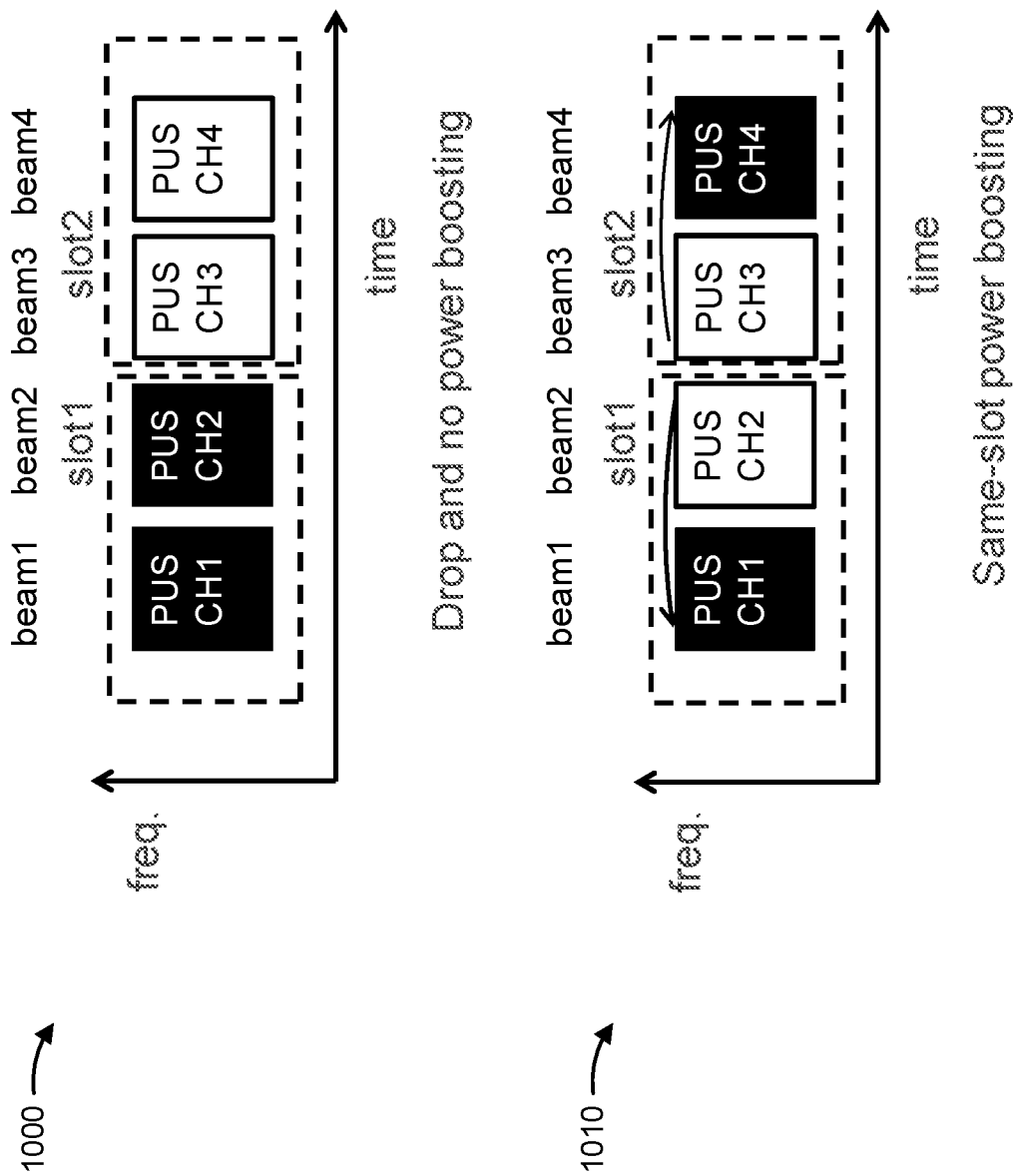
FIG. 10 illustrates examples of beam sweep adjustment for an MPE condition, in accordance with various aspects of the present disclosure.

FIG. 10 illustrates examples 1000, 1010 of beam sweep adjustment for an MPE condition, in accordance with various aspects of the present disclosure.

FIG. 10 shows an example 1000 where there is no power boosting. In example 1000, there are multiple physical uplink (e.g., PUSCH) repetitions in multiple slots, where each physical uplink repetition may be associated with a different beam. For example, PUSCH repetition 1 (PUSCH1) may be in beam1, PUSCH repetition 2 (PUSCH2) may be in beam2, PUSCH repetition 3 (PUSCH3) may be in beam3, and PUSCH repetition 4 (PUSCH4) may be in beam4. PUSCH repetitions 1 and 2 may be in slot 1. PUSCH repetitions 3 and 4 may be in slot 4. In example 1000, PUSCH repetitions 3 and 4 of beam3 and beam4 are dropped and PUSCH repetitions 1 and 2 are transmitted. In this case, there is no power boosting of remaining PUSCH repetitions 1 and 2 for beam1 and beam2. In other words, no power, which would have been used to transmit PUSCH repetitions 3 and 4 of beam3 and beam4, is used to boost the power of PUSCH repetitions 1 and 2 of beam1 and beam2.

FIG. 10 shows an example 1010 where there is same-slot boosting or intra-slot boosting. In example 1010, there are multiple PUSCH repetitions for an uplink communication in slots 1 and 2, where PUSCH repetitions 2 and 3 of beam2 and beam3 are dropped and PUSCH repetitions 1 and 4 for the uplink communication are transmitted. In some aspects, UE 820 may increase or boost a transmit power for another PUSCH repetition in the same slot. This may be referred to as same-slot boosting or intra-slot boosting. For example, intra-slot boosting may involve increasing a transmit power of PUSHC repetition 1 based at least in part on an original transmit power of PUSCH repetition 2, where PUSCH repetition 1 and PUSCH repetition 2 are both in slot 1.

As indicated above, FIG. 10 is provided as an example. Other examples are possible and may differ from what was described in connection with FIG. 10.

Figure 11:
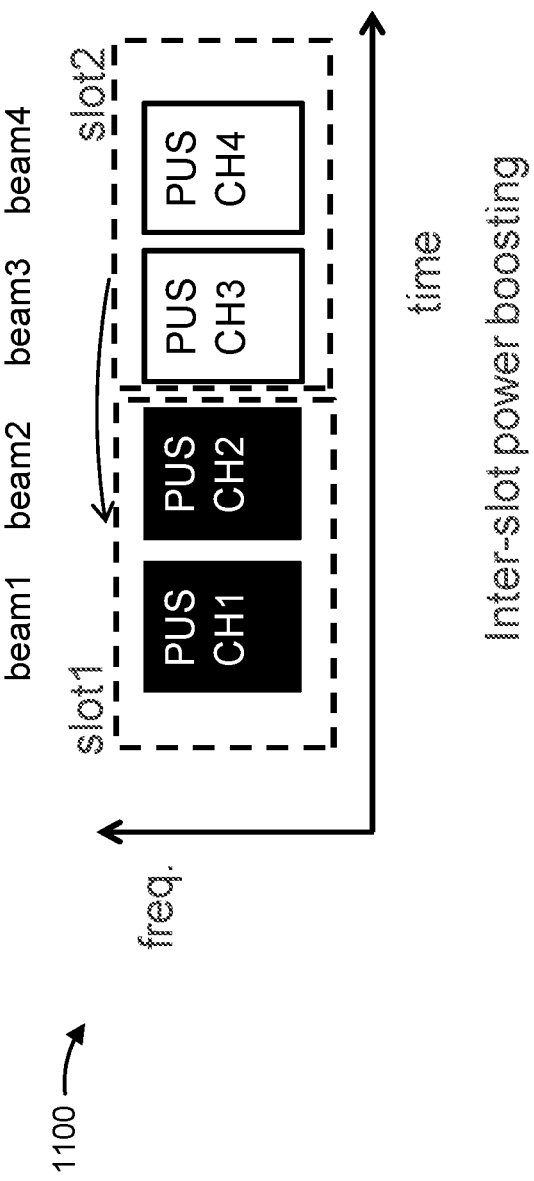
FIG. 11 illustrates an example of beam sweep adjustment for an MPE condition, in accordance with various aspects of the present disclosure.

FIG. 11 illustrates an example 1100 of beam sweep adjustment for an MPE condition, in accordance with various aspects of the present disclosure.

FIG. 11 shows an example 1100 where there is inter-slot power boosting. FIG. 11 shows multiple PUSCH repetitions in multiple slots for an uplink communication, such as shown in connection with FIG. 10. Each slot may include one or more different beams. If PUSCH repetitions 3 and 4 of beam3 and beam4 in slot 2 are dropped for the uplink communication, UE 820 may increase a transmit power of remaining repetitions 1 and 2 that are transmitted for the uplink communication on beam1 and beam2 of slot 1. This boosting may be referred to as inter-slot power boosting. A transmit power of each of remaining PUSCH repetitions 1 and 2 may be increased equally or proportionally.

As indicated above, FIG. 11 is provided as an example. Other examples are possible and may differ from what was described in connection with FIG. 11.

Figure 12:
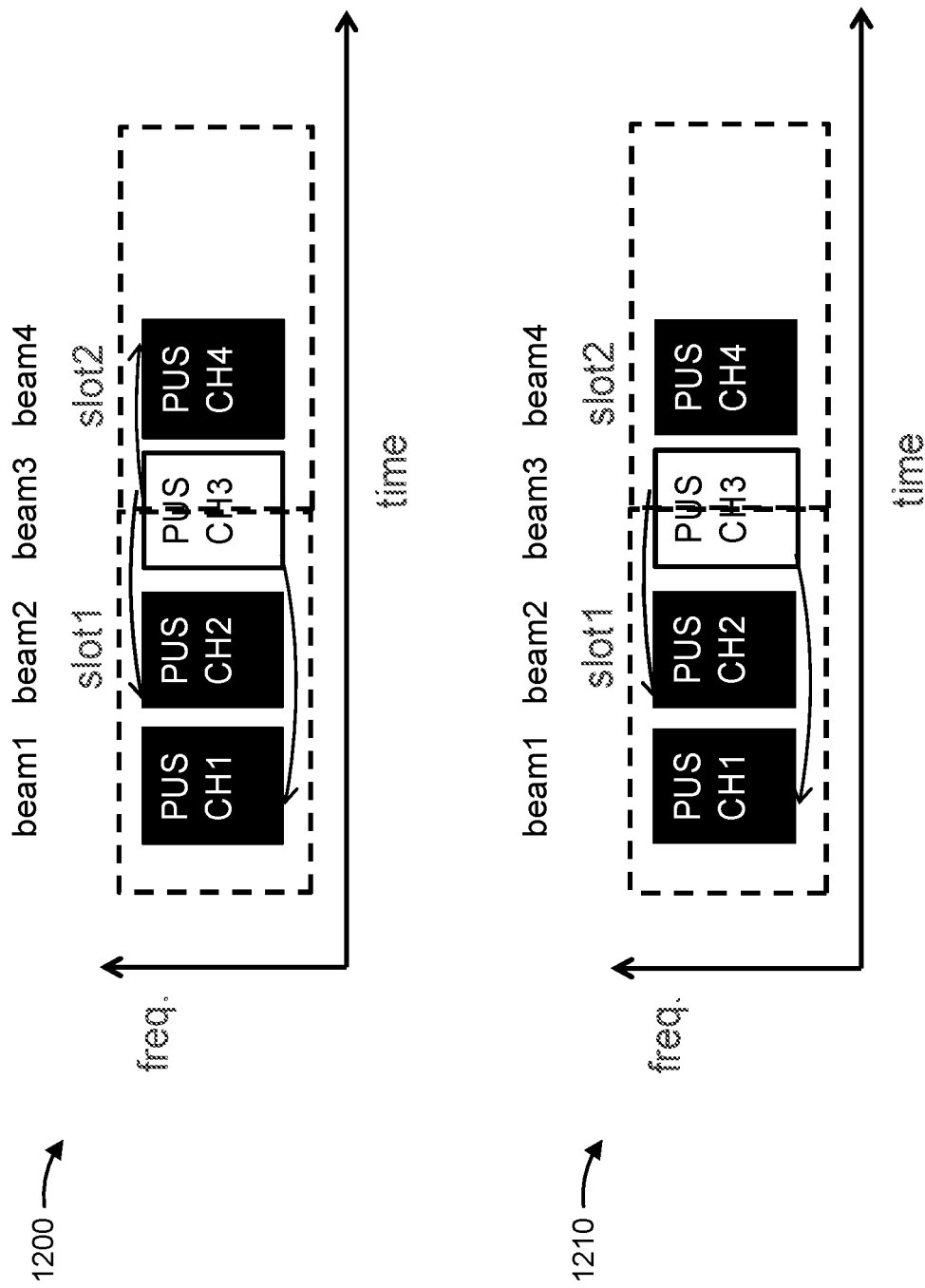
FIG. 12 illustrates examples of beam sweep adjustment for an MPE condition, in accordance with various aspects of the present disclosure.

FIG. 12 illustrates examples 1200, 1210 of beam sweep adjustment for an MPE condition, in accordance with various aspects of the present disclosure.

In some aspects, a PUSCH repetition may be on a boundary of two slots or split between two slots. FIG. 12 shows an example 1200 of PUSCH repetitions 1, 2, 3, and 4 for an uplink communication. Example 1200 shows a PUSCH repetition 3, split between slot 1 and slot 2, that is dropped, while PUSCH repetitions 1, 2, and 3 for the uplink communication are transmitted. In some aspects, UE 820 may drop PUSCH repetitions with redundancy version value of 1, 2, non-self-decodable repetitions, and/or the like. UE 820 may increase a transmit power of one or more remaining repetitions based at least in part on an original transmit power of dropped PUSCH repetition 3. If PUSCH repetition 3 is equally split between slot 1 and slot 2, remaining PUSCH repetitions in each slot may be equally boosted.

Alternatively, if PUSCH repetition 3 is proportionally split, remaining PUSCH repetitions in each slot may have an increase in a transmit power that corresponds to a split proportion of PUSCH repetition 3. For example, if PUSCH repetition 3 is split with 3 of 5 symbols (60%) in slot 1 and 2 of 5 symbols (40%) in slot 2, a transmit power of slot 1 may increase 50% more than a transmit power for slot 2, because 60% (in slot 1) is 50% more than 40% (in slot 2). Accordingly, the 60% of transmit power for PUSCH repetition 3 may be used to increase the transmit power for PUSCH repetitions 1 and 2, and the 40% of transmit power for PUSCH repetition 3 may be used to increase the transmit power for PUSCH repetition 4. Because two PUSCH repetitions (repetitions 1 and 2) are based at least in part on a portion of PUSCH repetition 3, PUSCH repetitions 1 and 2 may equally or proportionally split the increase in transmit power that is apportioned based at least in part on slot 1.

In some aspects, a transmit power for PUSCH repetitions may be increased for a single slot. FIG. 12 shows an example 1210 of an increase in transmit power for PUSCH repetitions only in slot 1. If a single slot is selected, the slot may be selected based at least in part on whether the slot has a larger power boost or a larger time span than another slot. The slot may be selected based at least in part on whether the slot has a smaller power boost or a smaller time span than another slot. The slot may be selected based at least in part on whether the slot is the earlier one or the latter one. Examples 1200 and 1210 may be considered examples of both intra-slot boosting and inter-slot boosting.

As indicated above, FIG. 12 is provided as an example. Other examples are possible and may differ from what was described in connection with FIG. 12.

Figure 13:
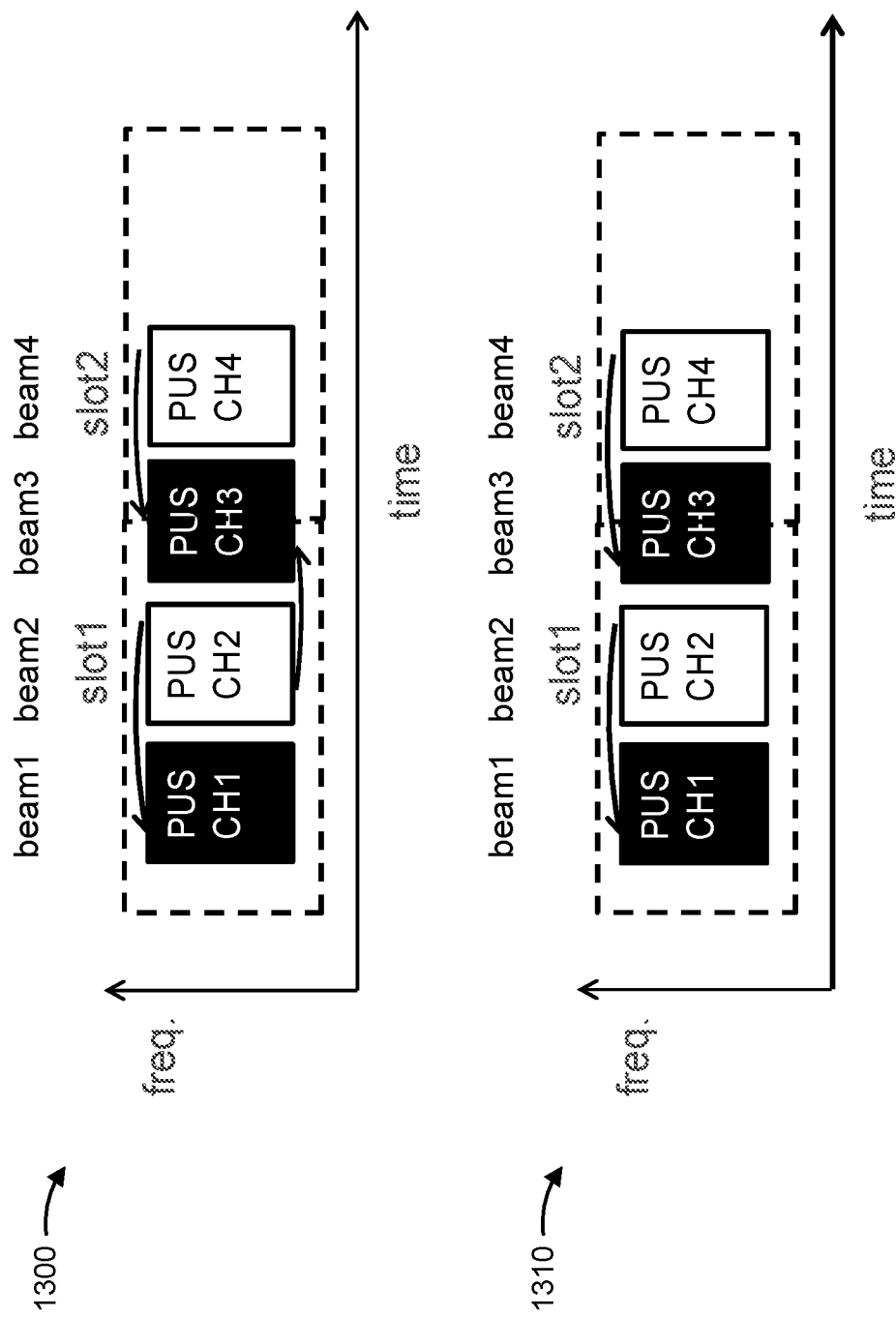
FIG. 13 illustrates examples of beam sweep adjustment for an MPE condition, in accordance with various aspects of the present disclosure.

FIG. 13 illustrates examples 1300, 1310 of beam sweep adjustment for an MPE condition, in accordance with various aspects of the present disclosure.

In some aspects, a PUSCH repetition may be on a boundary of two slots or split between two slots. FIG. 13 shows an example 1300 of PUSCH repetitions 2 and 4 for an uplink communication that are dropped from slots 1 and 2, respectively, while PUSCH repetitions 1 and 3 for the uplink communication are transmitted. PUSCH repetition 3 is split between slot 1 and slot 2. UE 820 may increase a transmit power of repetition 3 based at least in part on a sum of an original transmit power of PUSCH repetition 2 and an original transmit power of PUSCH repetition 4. In some aspects, UE 820 may increase a transmit power of remaining PUSCH repetition 1 based at least in part on an original transmit power of PUSCH repetition 2.

FIG. 13 shows an example 1300 of both PUSCH repetitions 1 and 3 being intra-slot power boosted based at least in part on PUSCH repetitions 2 and 4, where PUSCH repetition 3 is boosted based at least in part on both PUSCH repetition 2 and PUSCH repetition 4. The power boost may be equally split between slot 1 and slot 2. UE 820 may increase a transmit power of PUSCH repetition 3 based at least in part on equal transmit powers of PUSCH repetition 2 and PUSCH repetition 4. UE 820 may increase a transmit power of remaining PUSCH repetitions in each slot equally. If PUSCH repetition 3 is proportionally split, UE 820 may increase a transmit power of remaining PUSCH repetitions in each slot based at least in part on how PUSCH repetition 3 is split between slot 1 and slot 2. For example, if PUSCH repetition 3 is 60% in slot 1 and 40% in slot 2, UE 820 may increase a transmit power of PUSCH repetition 3 based 60% at least in part on an original transmit power of PUSCH repetition 2, and based 40% at least in part on an original transmit power of PUSCH repetition 4.

In some aspects, FIG. 13 shows an example 1310 where UE 820 may increase a transmit power of PUSCH repetition 1 based at least in part on an original transmit power for only PUSCH repetition 2. For example, while PUSCH repetition 3 is split between slot 1 and slot 2, UE 820 may increase a transmit power of PUSCH repetition 3 based at least in part on an original transmit power of PUSCH repetition 4. Example 1310 is another example of intra-slot power boosting.

As a result of dropping beams and rebalancing transmit power for PUSCH repetitions in other beams that are transmitted, UE 820 may successfully transmit the uplink communication while meeting an MPE constraint. UE 820 and BS 810 may save resources and avoid latency increases.

As indicated above, FIG. 13 is provided as an example. Other examples are possible and may differ from what was described in connection with FIG. 13.

Figure 14:
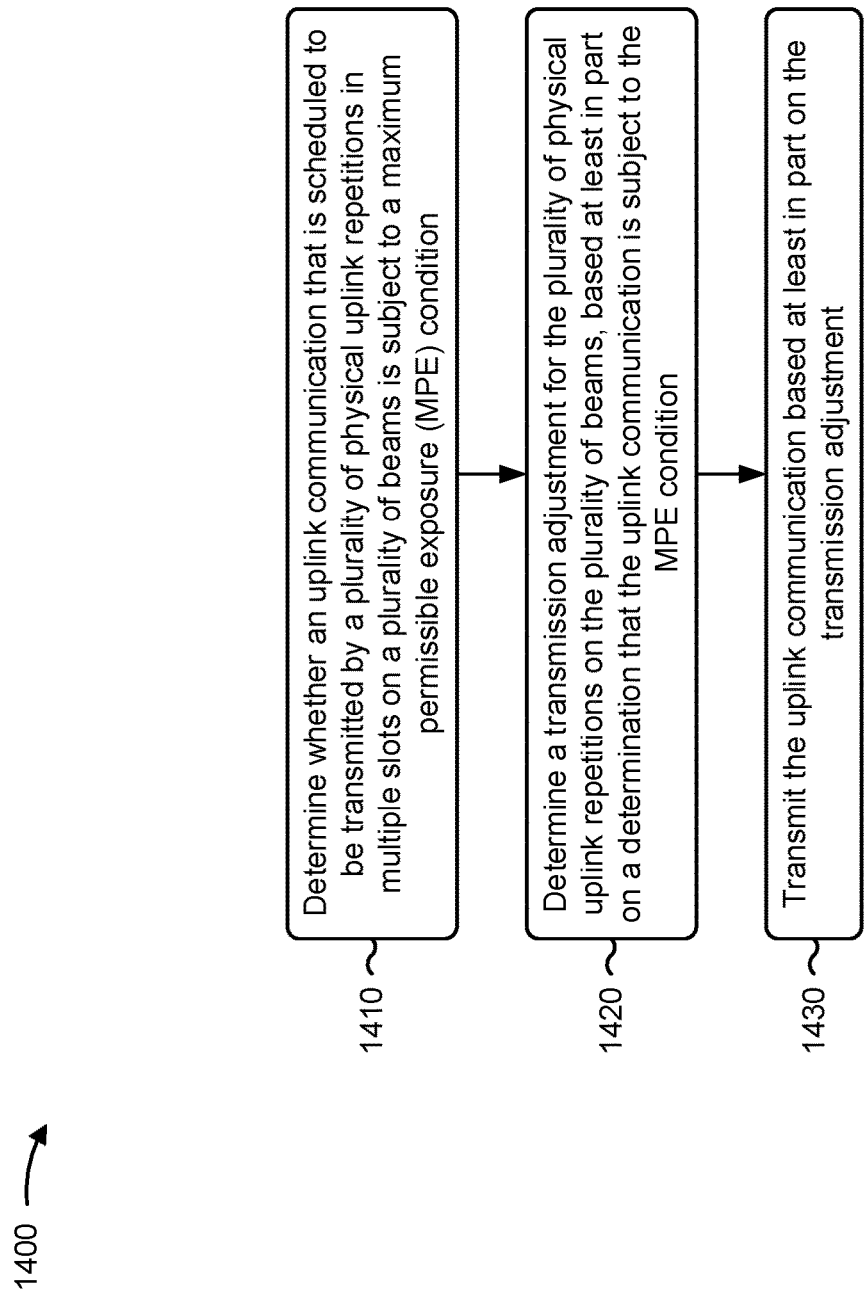
FIG. 14 is a diagram illustrating an example process performed, for example, by a UE, in accordance with various aspects of the present disclosure.

FIG. 14 is a diagram illustrating an example process 1400 performed, for example, by a UE, in accordance with various aspects of the present disclosure. Example process 1400 is an example where the UE (e.g., UE 120 depicted in FIGS. 1 and 2, UE 820 depicted in FIG. 8, and/or the like) performs operations associated with beam sweep adjustment for a maximum permissible exposure condition.

As shown in FIG. 14, in some aspects, process 1400 may include determining whether an uplink communication that is scheduled to be transmitted by a plurality of physical uplink repetitions in multiple slots on a plurality of beams is subject to an MPE condition (block 1410). For example, the UE (e.g., using receive processor 258, transmit processor 264, controller/processor 280, memory 282, and/or the like) may determine whether an uplink communication that is scheduled to be transmitted by a plurality of physical uplink repetitions in multiple slots on a plurality of beams is subject to an MPE condition, as described above.

As further shown in FIG. 14, in some aspects, process 1400 may include determining a transmission adjustment for the plurality of physical uplink repetitions on the plurality of beams, based at least in part on a determination that the uplink communication is subject to the MPE condition (block 1420). For example, the UE (e.g., using receive processor 258, transmit processor 264, controller/processor 280, memory 282, and/or the like) may determine a transmission adjustment for the plurality of physical uplink repetitions on the plurality of beams, based at least in part on a determination that the uplink communication is subject to the MPE condition, as described above.

As further shown in FIG. 14, in some aspects, process 1400 may include transmitting the uplink communication based at least in part on the transmission adjustment (block 1430). For example, the UE (e.g., using receive processor 258, transmit processor 264, controller/processor 280, memory 282, and/or the like) may transmit the uplink communication based at least in part on the transmission adjustment, as described above.

Process 1400 may include additional aspects, such as any single aspect or any combination of aspects described below and/or in connection with one or more other processes described elsewhere herein.

In a first aspect, the plurality of physical uplink repetitions are one or more of physical uplink shared channel repetitions, physical uplink control channel repetitions, or sounding reference signals.

In a second aspect, alone or in combination with the first aspect, the transmission adjustment includes dropping physical uplink repetitions for one or more of the plurality of beams based at least in part on a determination that the one or more beams of the plurality of beams are subject to the MPE condition.

In a third aspect, alone or in combination with one or more of the first and second aspects, process 1400 includes increasing a transmit power for ones of the plurality of physical uplink repetitions that are in one or more remaining beams of the plurality of beams.

In a fourth aspect, alone or in combination with one or more of the first through third aspects, process 1400 includes increasing the transmit power includes increasing the transmit power evenly among the physical uplink repetitions of the one or more remaining beams.

In a fifth aspect, alone or in combination with one or more of the first through fourth aspects, process 1400 includes increasing the transmit power includes increasing the transmit power of physical uplink repetitions for each respective beam of the one or more remaining beams based at least in part on a ratio of the transmit power of the respective beam to a total transmit power of the one or more remaining beams.

In a sixth aspect, alone or in combination with one or more of the first through fifth aspects, two or more of the plurality of physical uplink repetitions are in one slot.

In a seventh aspect, alone or in combination with one or more of the first through sixth aspects, the transmission adjustment includes dropping one or more physical uplink repetitions from a first slot and increasing a transmit power for one or more physical uplink repetitions in a second slot, based at least in part on a total transmit power of the one or more physical uplink repetitions dropped in the first slot.

In an eighth aspect, alone or in combination with one or more of the first through seventh aspects, the transmission adjustment includes dropping a physical uplink repetition from each slot that is subject to the MPE condition, and increasing a transmit power for a remaining physical uplink repetition in each respective slot based at least in part on a transmit power of the physical uplink repetition dropped in the respective slot.

In a ninth aspect, alone or in combination with one or more of the first through eighth aspects, the transmission adjustment includes dropping a physical uplink repetition that is split between a first slot and a second slot, and increasing a transmit power for one or more remaining physical uplink repetitions in the first slot and the second slot based at least in part on a transmit power of the physical uplink repetition that is dropped.

In a tenth aspect, alone or in combination with one or more of the first through ninth aspects, process 1400 includes increasing the transmit power for the one or more remaining physical uplink repetitions includes increasing the transmit power evenly among the one or more remaining physical uplink repetitions.

In an eleventh aspect, alone or in combination with one or more of the first through tenth aspects, process 1400 includes increasing the transmit power for the one or more remaining physical uplink repetitions includes increasing the transmit power for the one or more remaining physical uplink repetitions in the first slot based at least in part on a transmit power of the physical uplink repetition in the first slot, and increasing the transmit power for the one or more remaining physical uplink repetitions in the second slot based at least in part on a transmit power of the physical uplink repetition in the second slot.

In a twelfth aspect, alone or in combination with one or more of the first through eleventh aspects, the transmission adjustment includes dropping a physical uplink repetition that is split between a first slot and a second slot, and increasing a transmit power for one or more remaining physical uplink repetitions in the first slot based at least in part on a transmit power of the physical uplink repetition that is dropped.

In a thirteenth aspect, alone or in combination with one or more of the first through twelfth aspects, the first slot has a larger time span or a larger power boosting than the second slot.

In a fourteenth aspect, alone or in combination with one or more of the first through thirteenth aspects, the first slot has a smaller time span or a smaller power boosting than the second slot.

In a fifteenth aspect, alone or in combination with one or more of the first through fourteenth aspects, process 1400 includes increasing the transmit power includes increasing the transmit power evenly among the one or more remaining physical uplink repetitions in the first slot.

In a sixteenth aspect, alone or in combination with one or more of the first through fifteenth aspects, process 1400 includes increasing the transmit power includes increasing the transmit power for a first remaining physical uplink repetition in the first slot based at least in part on a first slot proportion of the physical uplink repetition that is dropped, and increasing the transmit power for a second remaining physical uplink repetition in the first slot based at least in part on a second slot proportion of the physical uplink repetition that is dropped.

In a seventeenth aspect, alone or in combination with one or more of the first through sixteenth aspects, the transmission adjustment includes dropping a first physical uplink repetition from a first slot and dropping a second physical uplink repetition from a second slot, and increasing a transmit power for a remaining physical uplink repetition split between the first slot and the second slot.

In an eighteenth aspect, alone or in combination with one or more of the first through seventeenth aspects, process 1400 includes increasing the transmit power includes increasing the transmit power based at least in part on a transmit power of the second physical uplink repetition, the second slot has a larger time span or a larger power boosting than the first slot.

In a nineteenth aspect, alone or in combination with one or more of the first through eighteenth aspects, process 1400 includes increasing the transmit power includes increasing the transmit power based at least in part on a transmit power of the second physical uplink repetition, the second slot has a smaller time span or a smaller power boosting that the first slot.

In a twentieth aspect, alone or in combination with one or more of the first through nineteenth aspects, process 1400 includes increasing the transmit power includes increasing the transmit power based at least in part on a sum of a transmit power of the first physical uplink repetition and a transmit power of the second physical uplink repetition.

In a twenty first aspect, alone or in combination with one or more of the first through twentieth aspects, process 1400 includes transmitting an indication of the transmission adjustment to a base station.

In a twenty second aspect, alone or in combination with one or more of the first through twenty first aspects, the indication of the transmission adjustment indicates one or more of a power value for one or more physical uplink repetitions, or one or more physical uplink repetitions that are dropped.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
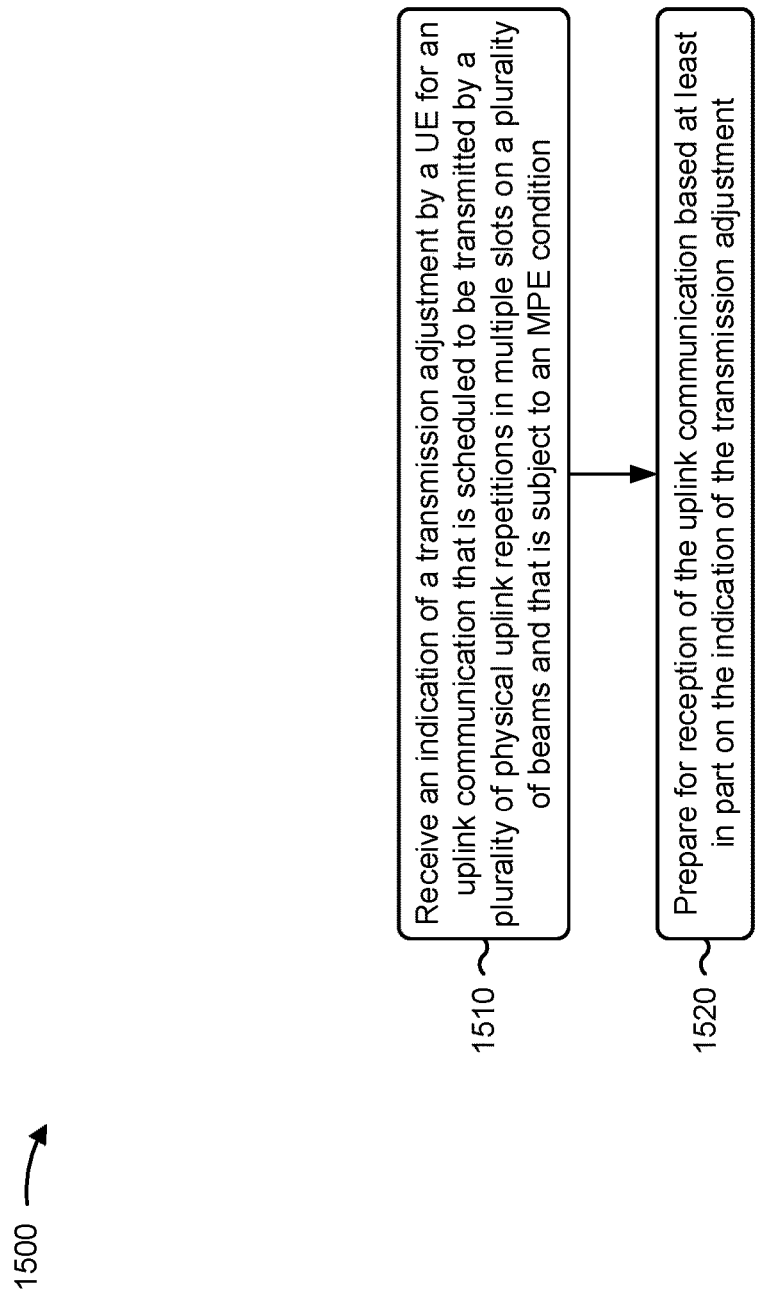
FIG. 15 is a diagram illustrating an example process performed, for example, by a base station, in accordance with various aspects of the present disclosure.

FIG. 15 is a diagram illustrating an example process 1500 performed, for example, by a base station, in accordance with various aspects of the present disclosure. Example process 1500 is an example where the base station (e.g., BS 110 depicted in FIGS. 1 and 2, BS 810 depicted in FIG. 8, and/or the like) performs operations associated with beam sweep adjustment for a maximum permissible exposure condition.

As shown in FIG. 15, in some aspects, process 1500 may include receiving an indication of a transmission adjustment by a UE for an uplink communication that is scheduled to be transmitted by a plurality of physical uplink repetitions in multiple slots on a plurality of beams and that is subject to an MPE condition (block 1510). For example, the base station (e.g., using transmit processor 220, receive processor 238, controller/processor 240, memory 242, and/or the like) may receive an indication of a transmission adjustment by a UE for an uplink communication that is scheduled to be transmitted by a plurality of physical uplink repetitions in multiple slots on a plurality of beams and that is subject to an MPE condition, as described above.

As further shown in FIG. 15, in some aspects, process 1500 may include preparing for reception of the uplink communication based at least in part on the indication of the transmission adjustment (block 1520). For example, the base station (e.g., using transmit processor 220, receive processor 238, controller/processor 240, memory 242, and/or the like) may prepare for reception of the uplink communication based at least in part on the indication of the transmission adjustment, as described above.

Process 1500 may include additional aspects, such as any single aspect or any combination of aspects described below and/or in connection with one or more other processes described elsewhere herein.

In a first aspect, preparing for reception includes preparing for a drop of physical uplink repetitions for one or more of the plurality of beams.

In a second aspect, alone or in combination with the first aspect, preparing for a drop of physical uplink repetitions for one or more of the plurality of beams includes adjusting a configuration of one or more receiving beams.

In a third aspect, alone or in combination with one or more of the first and second aspects, preparing for a drop of physical uplink repetitions for one or more of the plurality of beams includes dropping one or more receiving beams corresponding to one or more beams indicated as being subject to the MPE condition.

In a fourth aspect, alone or in combination with one or more of the first through third aspects, preparing for reception includes preparing for a drop of a physical uplink repetition from each slot indicated as being subject to the MPE condition.

In a fifth aspect, alone or in combination with one or more of the first through fourth aspects, preparing for reception includes preparing for a drop of a physical uplink repetition that is split between a first slot and a second slot.

In a sixth aspect, alone or in combination with one or more of the first through fifth aspects, preparing for reception includes preparing for a drop of a first physical uplink repetition from a first slot and a drop of a second physical uplink repetition from a second slot.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:

determining whether an uplink communication that is scheduled to be transmitted by a plurality of physical uplink repetitions in multiple slots on a plurality of beams is subject to a maximum permissible exposure (MPE) condition;

determining a transmission adjustment for the plurality of physical uplink repetitions on the plurality of beams, based at least in part on a determination that the uplink communication is subject to the MPE condition;

transmitting an indication of the transmission adjustment, wherein the indication of the transmission adjustment indicates one or more physical uplink repetitions that are dropped; and transmitting the uplink communication based at least in part on the transmission adjustment.

2. The method of claim 1, wherein the plurality of physical uplink repetitions are one or more of physical uplink shared channel repetitions, physical uplink control channel repetitions, or sounding reference signals.

3. The method of claim 1, wherein the transmission adjustment includes dropping physical uplink repetitions for one or more of the plurality of beams based at least in part on a determination that the one or more beams of the plurality of beams are subject to the MPE condition.

4. The method of claim 3, further comprising increasing a transmit power for ones of the plurality of physical uplink repetitions that are in one or more remaining beams of the plurality of beams.

5. The method of claim 4, wherein increasing the transmit power includes increasing the transmit power evenly among the physical uplink repetitions of the one or more remaining beams.

6. The method of claim 4, wherein increasing the transmit power includes increasing the transmit power of physical uplink repetitions for each respective beam of the one or more remaining beams based at least in part on a ratio of the transmit power of the respective beam to a total transmit power of the one or more remaining beams.

7. The method of claim 3, wherein two or more of the plurality of physical uplink repetitions are in one slot.

8. The method of claim 1, wherein the transmission adjustment includes dropping one or more physical uplink repetitions from a first slot and increasing a transmit power for one or more physical uplink repetitions in a second slot, based at least in part on a total transmit power of the one or more physical uplink repetitions dropped in the first slot.

9. The method of claim 1, wherein the transmission adjustment includes dropping a physical uplink repetition from each slot that is subject to the MPE condition, and increasing a transmit power for a remaining physical uplink repetition in each respective slot based at least in part on a transmit power of the physical uplink repetition dropped in the respective slot.

10. The method of claim 1, wherein the transmission adjustment includes dropping a physical uplink repetition that is split between a first slot and a second slot, and increasing a transmit power for one or more remaining physical uplink repetitions in the first slot and the second slot based at least in part on a transmit power of the physical uplink repetition that is dropped.

11. The method of claim 10, wherein increasing the transmit power for the one or more remaining physical uplink repetitions includes increasing the transmit power evenly among the one or more remaining physical uplink repetitions.

12. The method of claim 10, wherein increasing the transmit power for the one or more remaining physical uplink repetitions includes increasing the transmit power for the one or more remaining physical uplink repetitions in the first slot based at least in part on a transmit power of the physical uplink repetition in the first slot, and increasing the transmit power for the one or more remaining physical uplink repetitions in the second slot based at least in part on a transmit power of the physical uplink repetition in the second slot.

13. The method of claim 1, wherein the transmission adjustment includes dropping a physical uplink repetition that is split between a first slot and a second slot, and increasing a transmit power for one or more remaining physical uplink repetitions in the first slot based at least in part on a transmit power of the physical uplink repetition that is dropped.

14. The method of claim 13, wherein the first slot has a larger time span or a larger power boosting than the second slot.

15. The method of claim 13, wherein the first slot has a smaller time span or a smaller power boosting than the second slot.

16. The method of claim 13, wherein increasing the transmit power includes increasing the transmit power evenly among the one or more remaining physical uplink repetitions in the first slot.

17. The method of claim 13, wherein increasing the transmit power includes increasing the transmit power for a first remaining physical uplink repetition in the first slot based at least in part on a first slot proportion of the physical uplink repetition that is dropped, and increasing the transmit power for a second remaining physical uplink repetition in the first slot based at least in part on a second slot proportion of the physical uplink repetition that is dropped.

18. The method of claim 1, wherein the transmission adjustment includes dropping a first physical uplink repetition from a first slot and dropping a second physical uplink repetition from a second slot, and increasing a transmit power for a remaining physical uplink repetition split between the first slot and the second slot.

19. The method of claim 18, wherein increasing the transmit power includes increasing the transmit power based at least in part on a transmit power of the second physical uplink repetition, wherein the second slot has a larger time span or a larger power boosting than the first slot.

20. The method of claim 18, wherein increasing the transmit power includes increasing the transmit power based at least in part on a transmit power of the second physical uplink repetition, wherein the second slot has a smaller time span or a smaller power boosting that the first slot.

21. The method of claim 18, wherein increasing the transmit power includes increasing the transmit power based at least in part on a sum of a transmit power of the first physical uplink repetition and a transmit power of the second physical uplink repetition.

22. The method of claim 1, wherein transmitting the indication of the transmission adjustment further comprises:
transmitting the indication of the transmission adjustment to a base station.

23. The method of claim 1, wherein the indication of the transmission adjustment further indicates a power value for one or more remaining physical uplink repetitions.

24. A method of wireless communication performed by a base station, comprising:
receiving an indication of a transmission adjustment by a user equipment (UE) for an uplink communication that is scheduled to be transmitted by a plurality of physical uplink repetitions in multiple slots on a plurality of beams and that is subject to a maximum permissible exposure (MPE) condition, wherein the indication of the transmission adjustment indicates one or more physical uplink repetitions that are dropped; and preparing for reception of the uplink communication based at least in part on the indication of the transmission adjustment.

25. The method of claim 24, wherein preparing for reception includes preparing for a drop of the one or more physical uplink repetitions, wherein the one or more physical uplink repetitions are for one or more beams of the plurality of beams.

26. The method of claim 25, wherein preparing for the drop of the one or more physical uplink repetitions includes adjusting a configuration of one or more receiving beams.

27. The method of claim 25, wherein preparing for the drop of the one or more physical uplink repetitions includes dropping one or more receiving beams corresponding to one or more beams indicated as being subject to the MPE condition.

28. The method of claim 24, wherein preparing for reception includes preparing for a drop of a physical uplink repetition from each slot indicated as being subject to the MPE condition.

29. A user equipment (UE) for wireless communication, comprising:
a memory; and
one or more processors operatively coupled to the memory, the memory and the one or more processors configured to:
determine whether an uplink communication that is scheduled to be transmitted by a plurality of physical uplink repetitions in multiple slots on a plurality of beams is subject to a maximum permissible exposure (MPE) condition;
determine a transmission adjustment for the plurality of physical uplink repetitions on the plurality of beams, based at least in part on a determination that the uplink communication is subject to the MPE condition;
transmit an indication of the transmission adjustment, wherein the indication of the transmission adjustment indicates one or more physical uplink repetitions that are dropped; and
transmit the uplink communication based at least in part on the transmission adjustment.

30. A base station for wireless communication, comprising:
a memory; and
one or more processors operatively coupled to the memory, the memory and the one or more processors configured to:
receive an indication of a transmission adjustment by a user equipment (UE) for an uplink communication that is scheduled to be transmitted by a plurality of physical uplink repetitions in multiple slots on a plurality of beams and that is subject to a maximum permissible exposure (MPE) condition, wherein the indication of the transmission adjustment indicates one or more physical uplink repetitions that are dropped; and
prepare for reception of the uplink communication based at least in part on the indication of the transmission adjustment.

* * * * *